Patented Nov. 6, 1928.

1,690,622

UNITED STATES PATENT OFFICE.

OTTO W. COOK, OF ROCHESTER, NEW YORK, ASSIGNOR TO EASTMAN KODAK COMPANY, OF ROCHESTER, NEW YORK, A CORPORATION OF NEW YORK.

COMPOSITION FOR JOINING STRIPS OF MOTION-PICTURE FILMS.

No Drawing.   Application filed May 6, 1925. Serial No. 28,508.

My invention relates to film cements or liquid film solvent compositions such as are used in splicing together lengths of motion picture film.

In handling such film in the photographic dark room, particularly where long lengths of film are run through a continuous processing machine, it is necessary to join lengths of film and to repair breaks by subdued light of restricted wave length, usually in the red or orange portion of the spectrum. When using the ordinary cements of liquid film solvent compositions which are substantially colorless it is impossible to tell by sight just where they have been applied. I have, therefore, improved the film solvent composition or cement by adding thereto a small quantity of a dye that is absorptive of light of the wave lengths used. For regular dark room use, that is, for red light conditions such as are employed in handling negative film and orange light conditions such as are used in handling positive film, I have found any of the following dyes satisfactory: xylene blue; alphazurine G; acid green B; malachite green; toluidine blue; methylene green B and methylene blue. The above are the commercial names of dyes that are well-known, and are given with the chemical structural names in the 1924 Color Index of the Society of Dyers and Colorists. The dyes enumerated are spirit soluble and must be soluble in the film solvent composition or cement used.

The particular proportion of dye is relatively unimportant. While a very small amount only is necessary, more than is required does no harm and I usually add one ten-thousandth part or less of dye to the film solvent composition or cement.

Any of these dyes render the film solvent composition or cement absorptive of red and orange light so that it appears black in the dark, and the user can perceive at once just how much film solvent composition or cement he is applying and whether or not it covers the portion to be joined.

The particular film solvent composition or cement used is quite immaterial so long as the dye chosen is in solution in the composition. Among the most common are amyl acetate or acetone or mixtures of these with or without some scrap film in solution.

Having thus described my invention, what I claim as new and desire to secure by Letters Patent is:

1. The method of rendering visible under light of wave lengths in the red and orange portions of the spectrum a liquid composition used in joining strips of photographic film that comprises adding thereto a dye absorptive of light of such wave lengths.

2. A liquid composition of low viscosity for use in joining strips of motion picture film under red and orange light usual in photographic dark room conditions and containing a solvent for the film and, in solution therein, a dye that is absorptive of light waves predominantly in the red and orange portions of the spectrum.

Signed at Rochester, New York, this 2nd day of May, 1925.

OTTO W. COOK.